United States Patent
Zhang et al.

(10) Patent No.: US 11,540,276 B2
(45) Date of Patent: Dec. 27, 2022

(54) WIDEBAND TRANSMISSION WITH NARROWBAND MONITORING FOR NEW RADIO UNLICENSED SPECTRUM (NRU)

(71) Applicant: Apple Inc., Cupertino, CA (US)

(72) Inventors: Wei Zhang, Santa Clara, CA (US); Pengkai Zhao, San Jose, CA (US); Wei Zeng, San Diego, CA (US); Haitong Sun, Irvine, CA (US); Dawei Zhang, Saratoga, CA (US); Jia Tang, San Jose, CA (US); Johnson O. Sebeni, Fremont, CA (US); Ping Wang, San Jose, CA (US); Sami M. Almalfouh, San Jose, CA (US); Tianyan Pu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/578,996

(22) Filed: Sep. 23, 2019

(65) Prior Publication Data

US 2020/0107323 A1 Apr. 2, 2020

Related U.S. Application Data

(60) Provisional application No. 62/738,580, filed on Sep. 28, 2018.

(51) Int. Cl.
*H04W 72/04* (2009.01)
*H04W 16/14* (2009.01)

(52) U.S. Cl.
CPC ....... *H04W 72/0453* (2013.01); *H04W 16/14* (2013.01); *H04W 72/042* (2013.01)

(58) Field of Classification Search
CPC ............... H04W 16/14; H04W 72/042; H04W 72/0453; H04W 74/0808
See application file for complete search history.

(56) References Cited

U.S. PATENT DOCUMENTS

| 9,241,287 B2 | 1/2016 | Montojo |
| 9,877,278 B2 | 1/2018 | Sartori |

(Continued)

OTHER PUBLICATIONS

Vivo: "Discussion on the channel access procedures"; 3GPP Draft; R1-1808237; 3rd Generation Partnership Project (3GPP), Mobile Competence Centre; 650, Route Des Lucioles; F-06921 Sophia-Antipolis Cedex; France; vol. RAN WG1 Meeting #94, No. Gothenburg, Sweden; Aug. 10, 2018; six pages.

(Continued)

*Primary Examiner* — Saad A. Waqas
(74) *Attorney, Agent, or Firm* — Kowert, Hood, Munyon, Rankin & Goetzel, P.C.

(57) ABSTRACT

A device may wirelessly communicate according to a first radio access technology (RAT) within a first bandwidth part (BWP) of a frequency spectrum in which wireless communications according to other RAT(s) also take place. The device may be instructed to operate/communicate within a second BWP of the frequency spectrum responsive to the device successfully completing a listen-before-talk (LBT) procedure within a specified portion of the second BWP, where the second BWP contains the first BWP while the first BWP does not contain the specified portion of the second BWP. The device may also be instructed to operate/communicate within a specified frequency band (SFB) of the frequency spectrum responsive to the device successfully completing an LBT procedure within the SFB, where the SFB is not contiguous with the frequency band that includes the first BWP. The device may then simultaneously operate within the second frequency band and the first frequency band.

20 Claims, 8 Drawing Sheets

(56) References Cited

U.S. PATENT DOCUMENTS

| | | | |
|---|---|---|---|
| 10,251,066 B2 | 4/2019 | Xu | |
| 10,285,147 B2 | 5/2019 | Abedini | |
| 2016/0302092 A1 | 10/2016 | Sartori | |
| 2019/0132845 A1 | 5/2019 | Babaei | |
| 2019/0132862 A1* | 5/2019 | Jeon | H04L 5/0064 |
| 2019/0149274 A1 | 5/2019 | Freda | |
| 2019/0149305 A1 | 5/2019 | Zhou | |
| 2019/0261405 A1 | 8/2019 | Ang | |
| 2019/0274162 A1 | 9/2019 | Zhang | |
| 2019/0289513 A1* | 9/2019 | Jeon | H04W 72/0453 |
| 2020/0053777 A1* | 2/2020 | Babaei | H04W 72/042 |
| 2020/0053797 A1* | 2/2020 | Basu Mallick | H04W 74/0833 |
| 2020/0053799 A1* | 2/2020 | Jeon | H04W 74/0833 |
| 2020/0107364 A1* | 4/2020 | Xue | H04W 74/006 |

OTHER PUBLICATIONS

Vivo: Potential solutions and techniques: 3GPP Draft; RI-1801557; 3rd Generation Partnership Project (3GPP), Mobile Competence Centre; 650, Route Des Lucioles; F-06921 Sophia-Antipolis Cedex; France; vol. RAN WG1 Meeting #92, No. Athens, Greece; Feb. 15, 2018; six pages.
Extended European Search Report, European Patent Application No. 19200018.0, dated Feb. 7, 2020, nine pages.

* cited by examiner

WIDEBAND TRANSMISSION WITH NARROWBAND MONITORING FOR NEW RADIO UNLICENSED SPECTRUM (NRU)

PRIORITY CLAIM

This application claims benefit of priority of U.S. Provisional Patent Application Ser. No. 62/738,580 titled "Wideband Transmission with Narrowband Monitoring, and Cross-Slot Scheduling for New Radio Unlicensed Spectrum (NRU)", filed on Sep. 28, 2018, which is hereby incorporated by reference as though fully and completely set forth herein.

FIELD OF THE INVENTION

The present application relates to wireless communications, and more particularly to providing support for wideband transmissions with narrowband monitoring, and cross-slot scheduling enhancements for New Radio (NR) communications in the unlicensed spectrum (NR-U).

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

In general, wireless communication technologies, such as cellular communication technologies, are substantially designed to provide mobile communication capabilities to wireless devices. Furthermore, in addition to the communication standards mentioned above, there also exist extensions aimed at boosting transmission coverage in certain cellular networks. For example, LTE in Unlicensed spectrum (LTE-U) and NR in Unlicensed spectrum (NR-U) allows cellular carriers/service providers to boost coverage in their cellular networks by transmitting in unlicensed band(s) also used by other wireless communication technologies. In order to standardize operation of LTE and NR in the unlicensed bands, the use of a contention protocol referred to as listen-before-talk (LBT) was introduced. LBT facilitates coexistence of devices operating according to different wireless communication protocols on the same band. LBT procedures essentially allow a device to first sense its radio environment and find a network or free radio channel on which the device is allowed to operate, prior to starting wireless operations (e.g. transmissions).

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. The UEs, which may be mobile telephones or smart phones, portable gaming devices, laptops, wearable devices, PDAs, tablets, portable Internet devices, music players, data storage devices, or other handheld devices, etc. are generally powered by a portable power supply, e.g., a battery and may have multiple radio interfaces that enable support of multiple radio access technologies (RATs) as defined by the various wireless communication standards (LTE, LTE-A, NR, Wi-Fi, BLUETOOTH™, etc.). There are ongoing efforts not only to reduce power consumption required to perform wireless communications in order to improve the battery life of wireless devices, but also to achieve efficient use of wireless communication resources and thereby increase system efficiency.

However, increasing the functionality of a UE, for example adding functionality for NR and/or NR Unlicensed Spectrum (NR-U) deployment, can significantly affect system and device operations. As previously mentioned, NR-based access to the Unlicensed Spectrum (NRU) uses LBT procedures to target fair coexistence with other RATs on the unlicensed bands. These other RATs include Wi-Fi (with bandwidths—BWs—that are multiples of 20 MHz), and LTE LAA (Licensed Assisted Access, witch flexible BW with carrier aggregation—CA). NR provides a wider bandwidth compared to other RATs (up to 400 MHz) in a more flexible manner (bandwidth-part—BWP—design). A UE operating according to NR can be configured with up to 4 BWPs through the use of Downlink Control Information (DCI) and a timer-based switch. However, this wider bandwidth may potentially lead to lower LBT success rates and higher monitoring power.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for support in various devices, e.g. wireless communication devices, for performing wide band (width) transmissions with narrow band(width) monitoring, e.g. when operating in New Radio Unlicensed (NRU) spectrum. Embodiments are further presented herein for wireless communication systems containing wireless communication devices (UEs) and/or base stations and access points (APs) communicating with each other within the wireless communication systems.

Pursuant to the above, a device may wirelessly communicate according to a first radio access technology (RAT), e.g. NR, within a first bandwidth part (BWP) of a frequency spectrum in which wireless communications according to one or more other RATs, e.g. Wi-Fi and/or LTE LAA, also take place. The device may receive information instructing the device to operate/communicate within a second BWP of the frequency spectrum in response to the device successfully completing a listen-before-talk (LBT) procedure within a specified portion of the second BWP. The second BWP may contain the first BWP while the first BWP may not contain the specified portion of the second BWP. The device may then operate/communicate within the second BWP in response to receiving the information.

In some embodiments, the information may be included in downlink control information (DCI) transmitted to the device by a base station. The frequency spectrum may represent an unlicensed frequency spectrum. In some embodiments, the device may monitor the first BWP for an initial signal that carries control information, subsequent to a successfully completed LBT procedure by the device within the first BWP. Furthermore, the device may switch back to operating within the first bandwidth part in response to a channel occupancy time (COT) for the present wireless communications of the device ending, and/or the expiration of a BWP-inactivity timer. The first BWP may be a narrowband BWP, and the device may be one of a group of devices where each respective device in the group of devices operates/communicates in a different respective default BWP of the frequency spectrum assigned to the respective device. The different respective default BWPs assigned to the group of devices may be non-overlapping, while remaining BWPs of the frequency spectrum not assigned as the different respective default BWPs may overlap to ensure better spectrum efficiency. The size of the specified portion of the second BWP may be defined according to a type of expected interference from communications performed according to the one or more other RATs in the frequency spectrum.

In some embodiments, a device may wirelessly communicate according to a first RAT, e.g. NR, within a first frequency band (e.g. on a first carrier) in which wireless communications according to one or more other RATs, e.g. Wi-Fi and/or LTE LAA, also take place. The device may receive information instructing the device to also operate/communicate within a second frequency band (e.g. on a second carrier) in response to the device successfully completing an LBT procedure within the second frequency band, where the second frequency band is not contiguous with the first frequency band (e.g. the first carrier/frequency band and the second carrier/frequency band are non-contiguous). The device may then operate/communicate within the second frequency band while also operating/communicating within the first frequency band in response to receiving the information. The information may be included in DCI transmitted to the device by a base station. The device may monitor the first frequency band for an initial signal that carries control information, subsequent to a successfully completed LBT procedure within the first frequency band. The device may also receive second information instructing the device to no longer operate/communicate within the second frequency band (e.g. the second carrier/frequency band is being deactivated), and may cease operating within the second frequency band while still operating in the first frequency band in response to receiving the second information.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
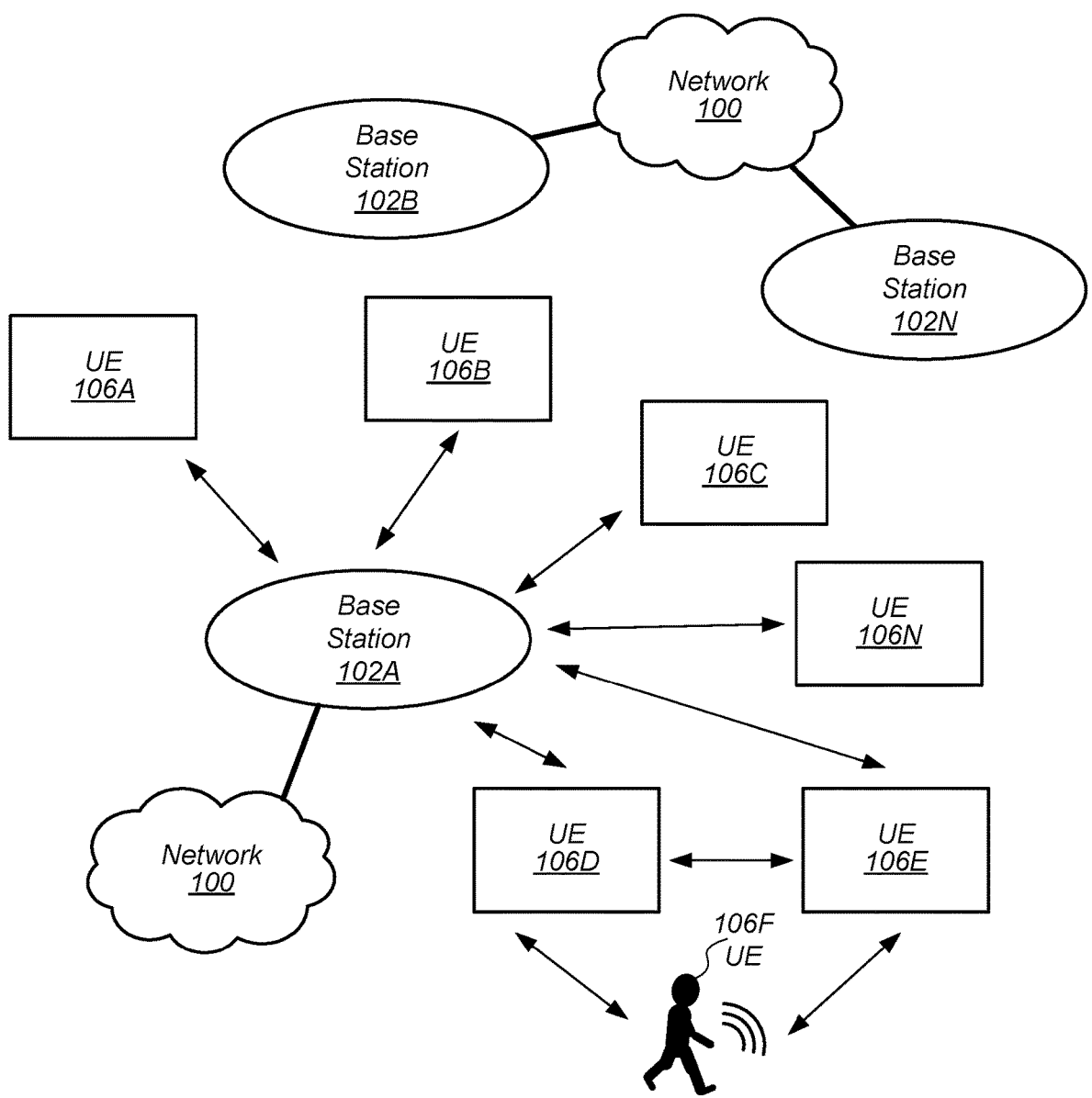
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
BS: Base Station
BSR: Buffer Size Report
BSSID: Basic Service Set Identifier
CBRS: Citizens Broadband Radio Service
CBSD: Citizens Broadband Radio Service Device
CCA: Clear Channel Assessment
CMR: Change Mode Request
CS: Circuit Switched
DL: Downlink (from BS to UE)
DSDS: Dual SIM Dual Standby DYN: Dynamic
EDCF: Enhanced Distributed Coordination Function
FDD: Frequency Division Duplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
KPI: Key Performance Indicator
LAN: Local Area Network
LBT: Listen Before Talk
LQM: Link Quality Metric
LTE: Long Term Evolution
MNO: Mobile Network Operator
NB: Narrowband
OOS: Out of Sync
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSD: Power Spectral Density
PSS: Primary Synchronization Signal
PT: Payload Type
QBSS: Quality of Service Enhanced Basic Service Set
QI: Quality Indicator
RAT: Radio Access Technology
RF: Radio Frequency
ROHC: Robust Header Compression
RTP: Real-time Transport Protocol
RTT: Round Trip Time
RX: Reception/Receive
SAS: Spectrum Allocation Server
SID: System Identification Number
SIM: Subscriber Identity Module
SGW: Serving Gateway
SMB: Small/Medium Business
SSS: Secondary Synchronization Signal
TBS: Transport Block Size
TCP: Transmission Control Protocol
TDD: Time Division Duplexing
TX: Transmission/Transmit
UE: User Equipment
UL: Uplink (from UE to BS)
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
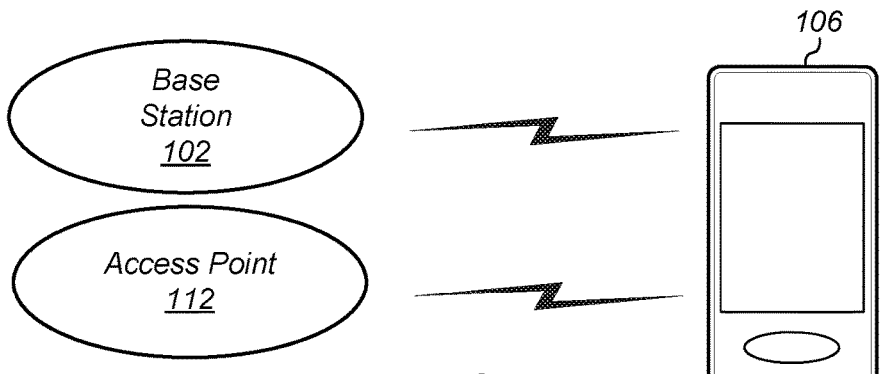
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may perform wideband transmissions with narrow band monitoring, e.g. when operating in New Radio Unlicensed (NRU) spectrum, according to various embodiments disclosed herein.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, neutral host or various CBRS (Citizens Broadband Radio Service) deployments, among various possibilities). Thus, the base station 102 may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station(s) 102 are implemented in the context of LTE, they may alternately be referred to as an 'eNodeB' or 'eNB'. Note that if the base station 102A is implemented in the context of 5G NR, it may alternately be referred to as 'gNodeB' or 'gNB'. In some embodiments, the base station(s) 102 may perform wideband transmissions with narrow band monitoring, e.g. when operating in an NRU spectrum on the network serviced by base station(s) 102, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to CBRS. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services. Base station 102A and other similar base stations (such as base stations 102B . . . 102N) operating according to the same or a different cellular communication standard may thus be provided as a network of cells, which may provide continuous or nearly continuous overlapping service to UEs 106A-106N and similar devices over a geographic area via one or more cellular communication standards.

Thus, while base station 102A may act as a "serving cell" for UEs 106A-106N as illustrated in FIG. 1, each one of UE(s) 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-102B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE(s) 106 may be capable of communicating using multiple wireless communication standards. For example, a UE might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, UE(s) 106 may also communicate with Network 100, through one or more base stations or through other devices, stations, or any appliances not explicitly shown but considered to be part of Network 100. UE(s) 106 communicating with a network may therefore be interpreted as the UE(s) 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

As also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner. Further aspects of vehicles communicating in network exemplified in FIG. 1 are described, for example, in the context of vehicle-to-everything (V2X) communications such as the communications specified by 3GPP TS 22.185 V 14.3.0, among others.

FIG. 2 illustrates an exemplary user equipment 106 (e.g., one of the devices 106-1 through 106-N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
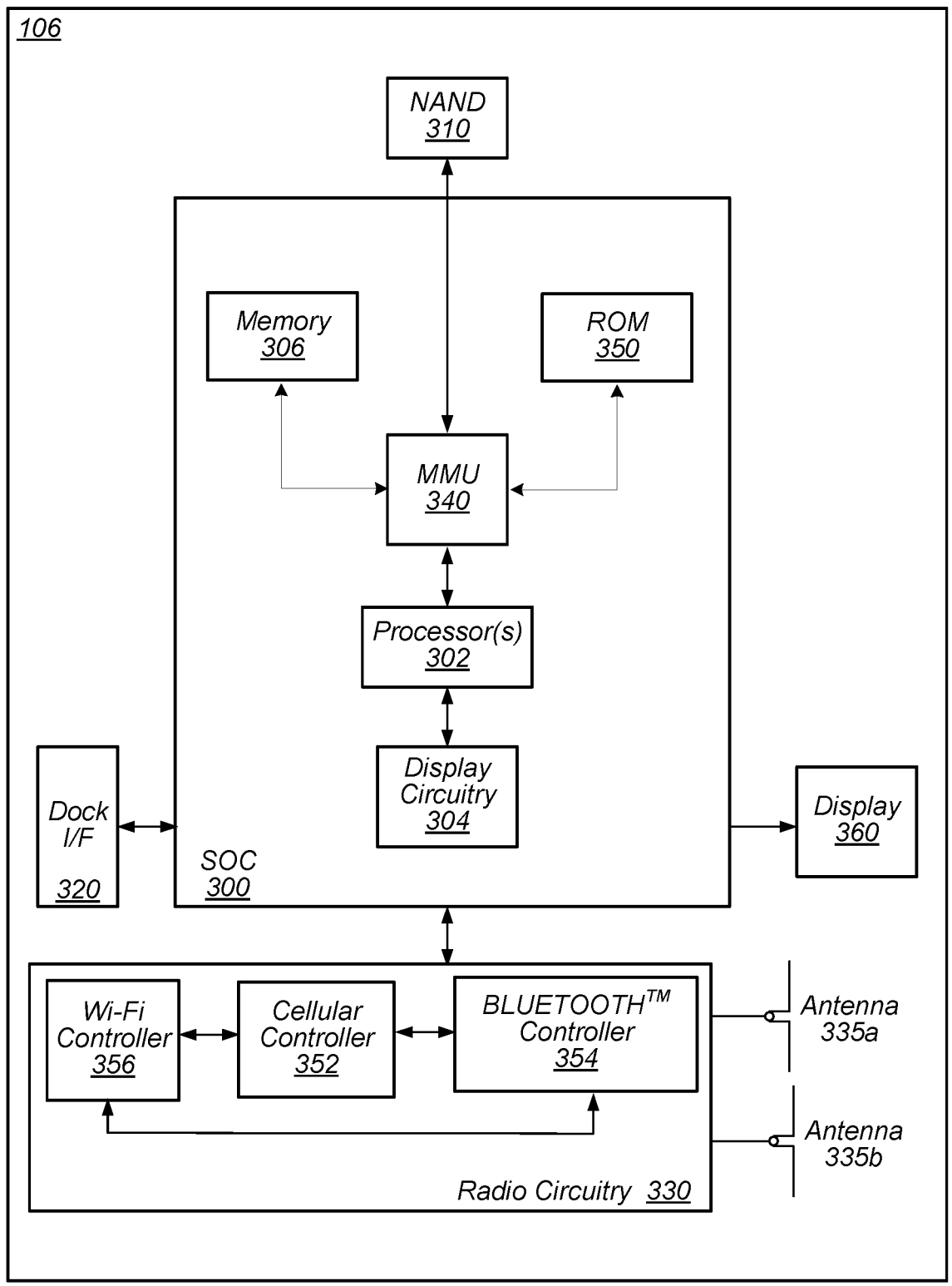
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to perform wideband transmissions with narrow band monitoring, e.g. when operating in an NRU spectrum as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform wideband transmissions with narrow band monitoring, e.g. when operating in an NRU spectrum according to various embodiments disclosed herein. Processor(s) 302 may also implement various other applications and/or end-user applications running on UE 106.

Figure 5:
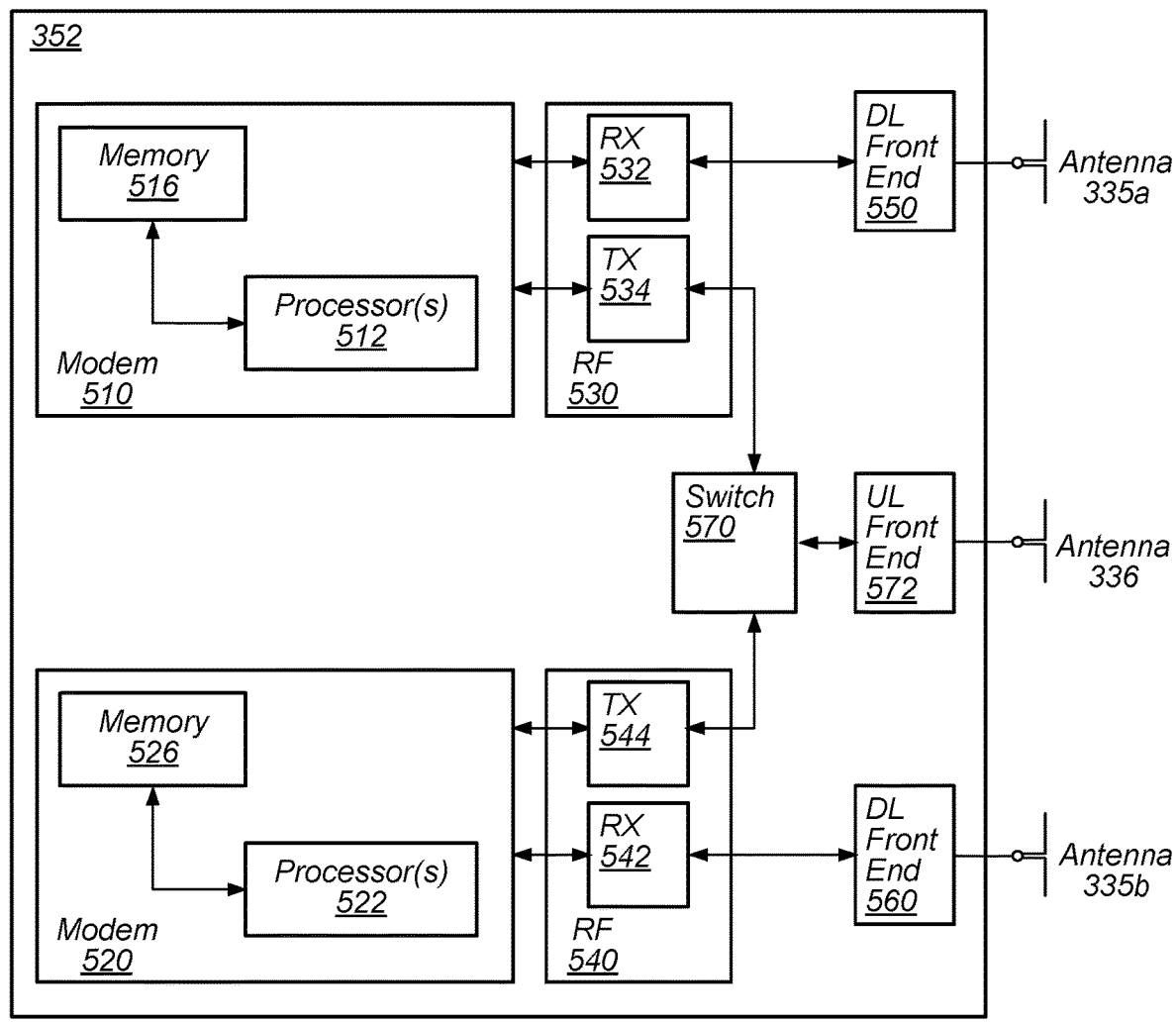
FIG. 5 shows an exemplary diagram illustrating cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 and will be further described below.

Figure 4:
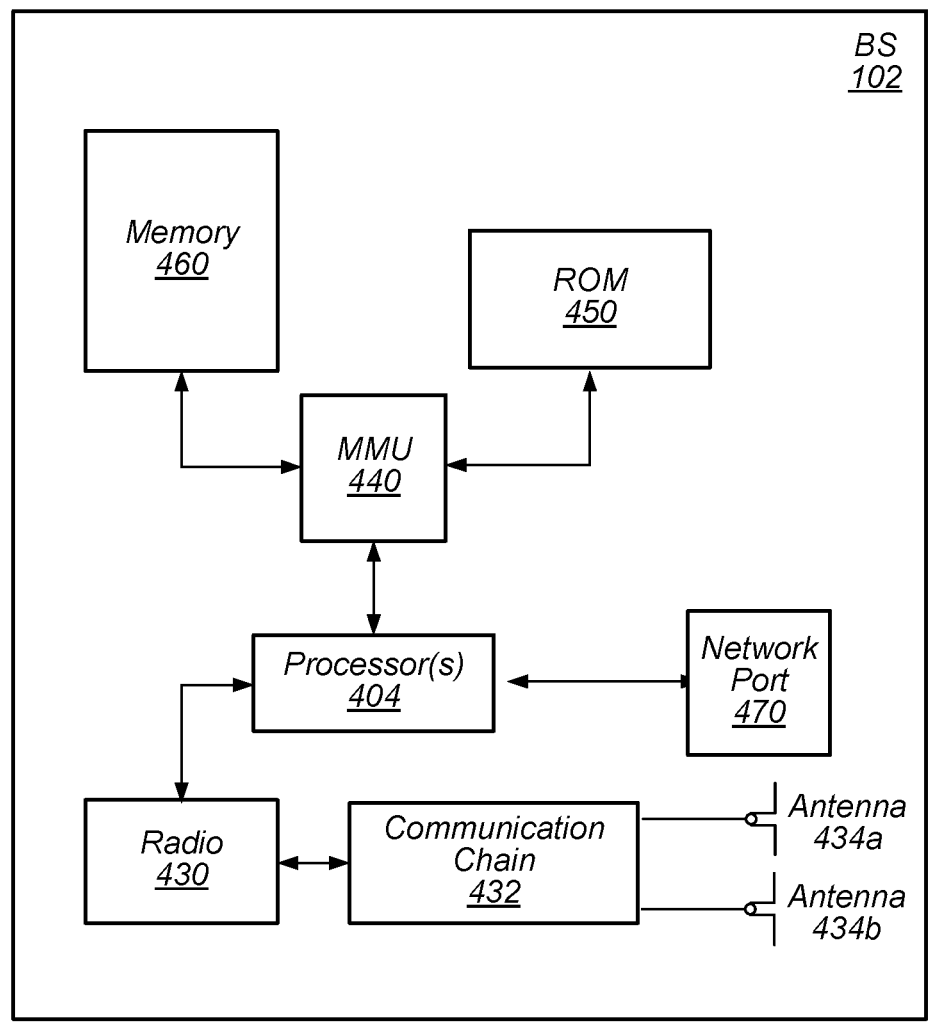
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, (e.g. illustrated by antennas 434a and 434b) for performing wireless communication with mobile devices and/or other devices. Antennas 434a and 434b are shown by way of example, and base station 102 may include fewer or more antennas. Overall, the one or more antennas, which may include antenna 434a and/or antenna 434b are collectively referred to as antenna(s) 434. Antenna(s) 434 may be configured to operate as a wireless transceiver and may be further configured to communicate with UE devices 106 via radio circuitry 430. The antenna(s) 434 communicate with the radio 430 via communication chain 432. Communication chain 432 may be a receive chain, a transmit chain or both. The radio 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device and facilitate wideband transmissions with narrowband monitoring, e.g. when operating in an NRU spectrum. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein for performing wideband transmissions with narrow band monitoring, e.g. when operating in an NRU spectrum.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Wideband Transmission with Narrowband Monitoring

As previously mentioned, NR access to the unlicensed spectrum (NRU) needs to coexist with access to the same unlicensed spectrum by other RATs, e.g. by Wi-Fi and LTE-LAA. NR provides a wider bandwidth compared to other RATs, and is more flexible. However, the wider bandwidth may potentially lead to lower LBT success rates and higher monitoring power. Wideband LBT operation and dynamic BWP (bandwidth part)/carrier assignment is thus important for NRU-directed designs in order to achieve a proper balance between spectrum efficiency and power savings. As a comparison, LTE-LAA (Licensed Assisted Access) has adopted a multi-carrier carrier aggregation (CA) and listen-before-talk (LBT) oriented design to improve the spectrum efficiency when coexisting with other RATs, e.g. with Wi-Fi.

A carrier bandwidth part (BWP) is a contiguous set of physical resource blocks selected from a contiguous subset of the common resource blocks for a given numerology on a given carrier. For downlink, the UE may be configured with up to a specified number of carrier BWPs (e.g. four BWPs, per current specifications), with only one BWP per carrier active at a given time. For uplink, the UE may similarly be configured with up to several (e.g. four) carrier BWPs, with only one BWP per carrier active at a given time. If a UE is configured with a supplementary uplink, then the UE may be additionally configured with up to the specified number (e.g. four) carrier BWPs in the supplementary uplink, with only one carrier BWP active at a given time.

The development of NR specifications and proposed deployment includes an "initial-signal-based" (IS-based) design. According to the IS-based design, at the beginning of transmission, following a successful LBT procedure, the UE may begin monitoring for the IS. The IS may be implemented in a variety of ways, e.g. as preambles, as an NR control signal, as a Demodulation Reference Signal (DMRS) on the Physical Downlink Control Channel (PDCCH), to provide just a few examples. The IS may carry simple control information such as a wakeup signal and/or channel occupancy time (COT), and may be used to occupy the channel before the subframe boundary, following LBT success (i.e. following a successfully completed LBT procedure by the UE). Typically, wide bandwidth (wideband) operation is preferred at the transmitter side for power efficiency and system capacity benefits. However, when monitoring for the IS at the receiver side, narrow bandwidth (narrowband) operation is preferred.

For at least the above reasons, a systematic design for wideband transmission with narrowband sensing or narrowband monitoring may be developed in order to achieve both power and spectrum efficiency. In some embodiments, three different approaches may be taken to accomplish this:

A BWP-based approach, in which wideband transmissions with narrowband monitoring and bandwidth breathing take place within the same COT;

A multi-carrier-based approach, which addresses communications in a non-contiguous spectrum; and A combined BWP-based/multi-carrier-based approach.

BWP-Based Approach

Figure 6:
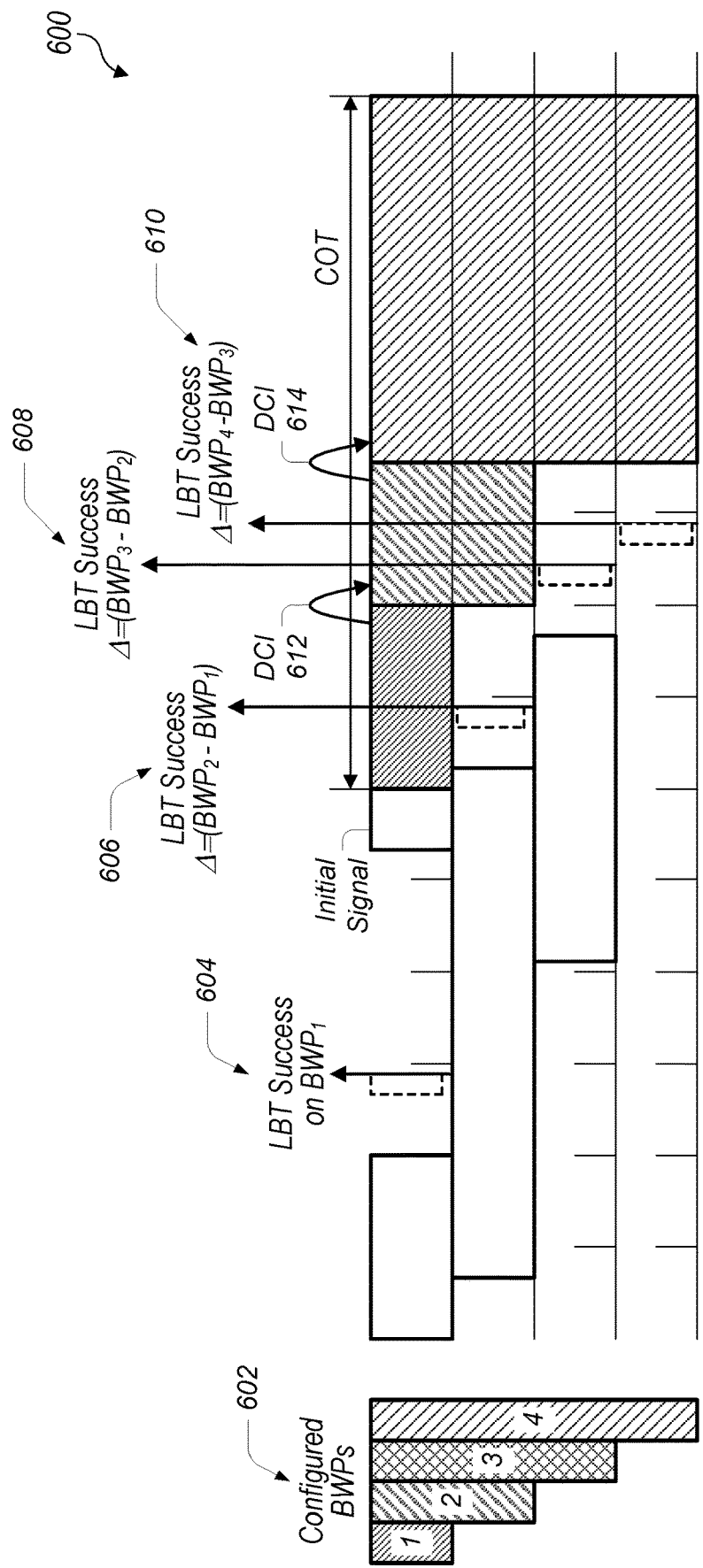
FIG. 6 shows an exemplary time diagram illustrating a bandwidth part based approach to implementing wideband transmission with narrowband monitoring, according to some embodiments.

A BWP-based approach for wideband transmissions with narrowband monitoring is illustrated in FIG. 6. As shown in time diagram 600 of FIG. 6, each UE (device, or wireless communication device) may be configured with up to four (4) BWPs 602 with one of the BWPs designated as the default BWP. In some embodiments, the default BWP may be contained in other configured BWPs, and transmissions for each COT may start/begin on the default BWP first. The IS following a successful LBT procedure may only be transmitted on the default BWP for this UE (for either downlink, DL, or uplink, UL, reservations). All UEs assigned on the same default BWP may monitor that same default BWP to determine whether the channel is free. Within the same COT, the transmitter may keep sensing the medium for the opportunity to increase BW by switching BWPs. Only the progressive difference (delta) between each BWP may need to be sensed, e.g. $\Delta(BWP_1, BWP_2)$, which refers to the difference between $BWP_1$ and $BWP_2$, $\Delta(BWP_2, BWP_3)$, which refers to the difference between $BWP_2$ and $BWP_3$, etc. Once a BWP is determined to be free, the transmitter may directly use the wider BWP by transmitting downlink control information (DCI) to communicate the BWP change/switch to the receiving device (UE). The UE may then switch back to the default BWP once one or more conditions are met, for example at the end of the COT and/or upon expiration of a BWP-inactivity timer.

As shown in time diagram 600, the BW is represented on the vertical axis while time is represented on the horizontal axis. $BWP_1$ is configured as the default BWP, which is of smaller bandwidth (BW) than BWPs 2-4 and is contained in BWPs 2-4, with $BWP_4$ being of the highest (largest or widest) BW. Upon LBT success on $BWP_1$ (604), the UE may monitor for the IS, and upon receiving and processing information contained in the IS, the UE may begin operations (communications) on $BWP_1$ at the beginning of the COT of the UE. The transmitter (e.g. base station, such as gNB) may continue monitoring/sensing the medium, e.g. the frequency band represented by $\Delta(BWP_1, BWP_2)$, i.e. $BWP_2$–$BWP_1$, to identify/determine if that band is suitable for communications for the UE. Accordingly, subsequent to a successful LBT procedure performed in $\Delta(BWP_1, BWP_2)$ by the UE (606), the transmitter (e.g. the gNB) may inform the UE, through transmission of DCI 612 for example, to switch from $BWP_1$ to $BWP_2$, which extends the overall bandwidth for wireless communications of the UE since $BWP_2$ contains $BWP_1$, as indicated in FIG. 6. As further illustrated in FIG. 6, within the same COT, the UE may perform a successful LBT procedure (608) in BWP and a successful LBT procedure (610) in $BWP_4$, which may lead the transmitter, which was monitoring $\Delta(BWP_2, BWP_3)$ and $\Delta(BWP_3, BWP_4)$, to transmit DCI 614 to the UE to switch from $BWP_2$ to $BWP_4$, which also contains $BWP_1$, $BWP_2$, and $BWP_3$. As noted above, the UE may switch back to $BWP_1$ upon certain conditions having been met, e.g. upon expiration of a BWP inactivity timer or at the end of the UE's COT.

Figure 7:
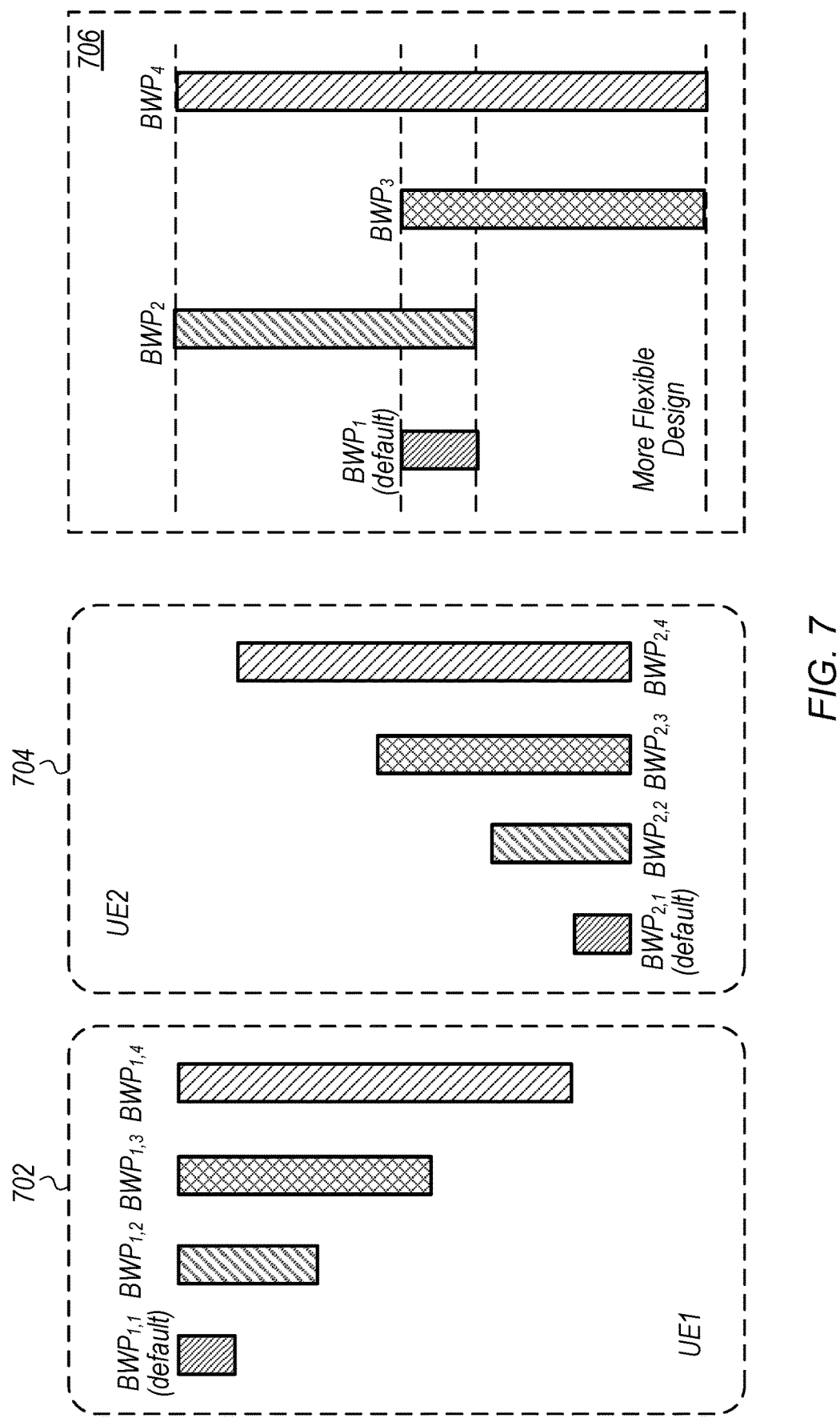
FIG. 7 shows an exemplary diagram illustrating bandwidth part assignments when performing wideband transmission with narrowband monitoring, according to some embodiments.

In some embodiments, the UEs in the network may only monitor their assigned narrowband default BWPs for traffic. That is, each UE in the network may only monitor its assigned narrowband BWP for traffic. The different or respective UEs may be assigned to different non-overlapping default BWPs, while the other non-default BWPs assigned to each UE may be overlapping BWPs to ensure better spectrum efficiency. This is illustrated in FIG. 7, which shows BWP assignments (702) for a first UE (UE1) and BWP assignments (704) for a second UE (UE2). Default $BWP_{1,1}$ assigned to UE1, and default $BWP_{2,1}$ assigned to UE2 are at opposite ends of the bandwidth (or entire spectrum encompassed by the four BWPs), and do not overlap. However, $BWP_{1,2}$ and $BWP_{2,4}$ overlap, as do $BWP_{1,3}$, $BWP_{2,3}$, and $BWP_{2,4}$, and $BWP_{1,4}$, $BWP_{2,2}$, $BWP_{2,3}$, and $BWP_{2,4}$. Thus, in the example shown in FIG. 7, the two UEs are assigned default BWPs at two ends of the BW, while the spectrum in the middle of the BW is shared using other assigned BWPs.

By grouping different UEs to be allocated default BWPs, competition between UEs for frequency resources may be greatly alleviated within NRU. Such BWP allocation also improves LBT success probability by grouping closely located UEs to avoid the same interference source. It also provides a more flexible design, as the assignment/allocation of BWPs may help spectrum efficiency, and BWP switching that does not require a center frequency change. This is also illustrated in diagram 706 of FIG. 7, where the default BWP ($BWP_1$) is situated around the center frequency, with $BWP_2$ and $BWP_3$ respectively situated in the upper half and lower half of the frequency band with respect to the center frequency, and $BWP_4$ spanning the entire band (or entire spectrum).

Figure 8:
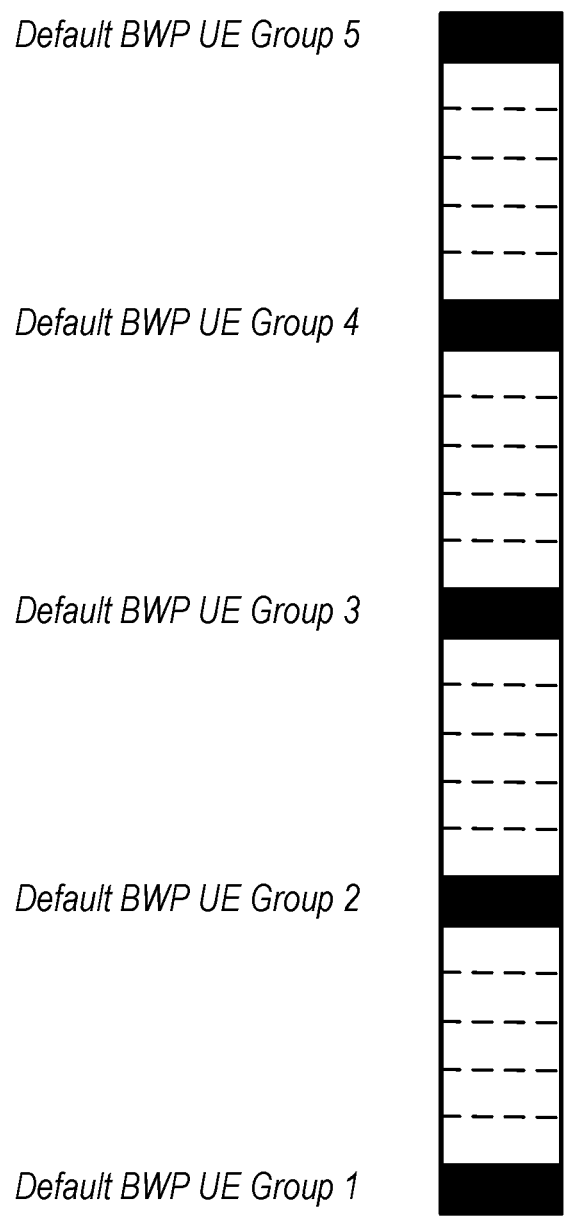
FIG. 8 shows an exemplary diagram illustrating default bandwidth part device groupings when performing wideband transmission with narrowband monitoring, according to some embodiments.

When considering system designs, the default BWP for initial signal transmission may be preferably selected as the BWP having (or exhibiting) the lowest interference, and may therefore be considered as the BWP offering the highest probability for reliable transmissions. Thus, in some embodiments, UEs experiencing interference from the same interference source may be grouped together and moved around the frequency spectrum for a better LBT success rate, as illustrated in FIG. 8. As shown in FIG. 8, UEs may be grouped together, with each group of UEs associated with a default BWP. The exemplary diagram in FIG. 8 illustrates a total number of 5 default BWP UE groups. The network may dynamically adjust the default BWP setup and UE assignment(s) to adapt to the traffic load of other RATs using the unlicensed spectrum, e.g. to adapt to Wi-Fi and/or LTE-LAA traffic load. The UE may provide feedback representative of the local traffic ratio to assist the network in determining the traffic of the assigned BWPs at the UEs.

The BWP-based approach also provides flexibility in addressing the various different types of interference or different interference types. Accordingly, the delta (Δ), or difference between the incremental BWPs, may be determined or designated or defined according to the type of (expected) interference. Thus, in addressing communications conducted according to a first RAT interfering with communications conducted according to a second RAT, the Δ among incremental BWPs may be a multiple of a specific frequency. For example, in addressing Wi-Fi interference with respect to LTE communications, the delta (Δ) among the incremental BWPs may be multiple(s) of 20 MHz. Referring again to FIG. 6, Δ(BWP$_1$, BWP$_2$) may span 20 MHz. Decisions regarding the Δ value(s) may in part be informed by various factors related to the communications standards. According to one such factor, at least for a frequency band where the absence of Wi-Fi cannot be guaranteed (because of regulations, for example), LBT may be performed in bandwidths of 20 MHz. When interference is caused by LTE-LAA communications, BWP assignments may be more flexible as the BWs in LTE may vary between 5 MHz, 10 MHz, 15 MHz, and 20 MHz.

Multi-Carrier-Based Approach

The BWP-based approach described above assumes the available spectrum to be contiguous. For further improvements, instead of configuring multiple BWPs the entire spectrum may be divided into a multiple-carrier setup, in which each UE may be designed to operate on multiple carriers with one designated anchor/default carrier. The IS for reserving the medium may be transmitted on the anchor carrier. Within the same COT, other carriers may be activated, e.g. by using DCI with cross-carrier scheduling. In this approach, the spectrum need not be assumed to be contiguous, and carriers may also be deactivated as warranted and/or when no longer needed, e.g. using DCI. In some embodiments, a new DCI format may be added for the purpose of activating and deactivating carriers in a multiple-carrier setup.

Figure 9:
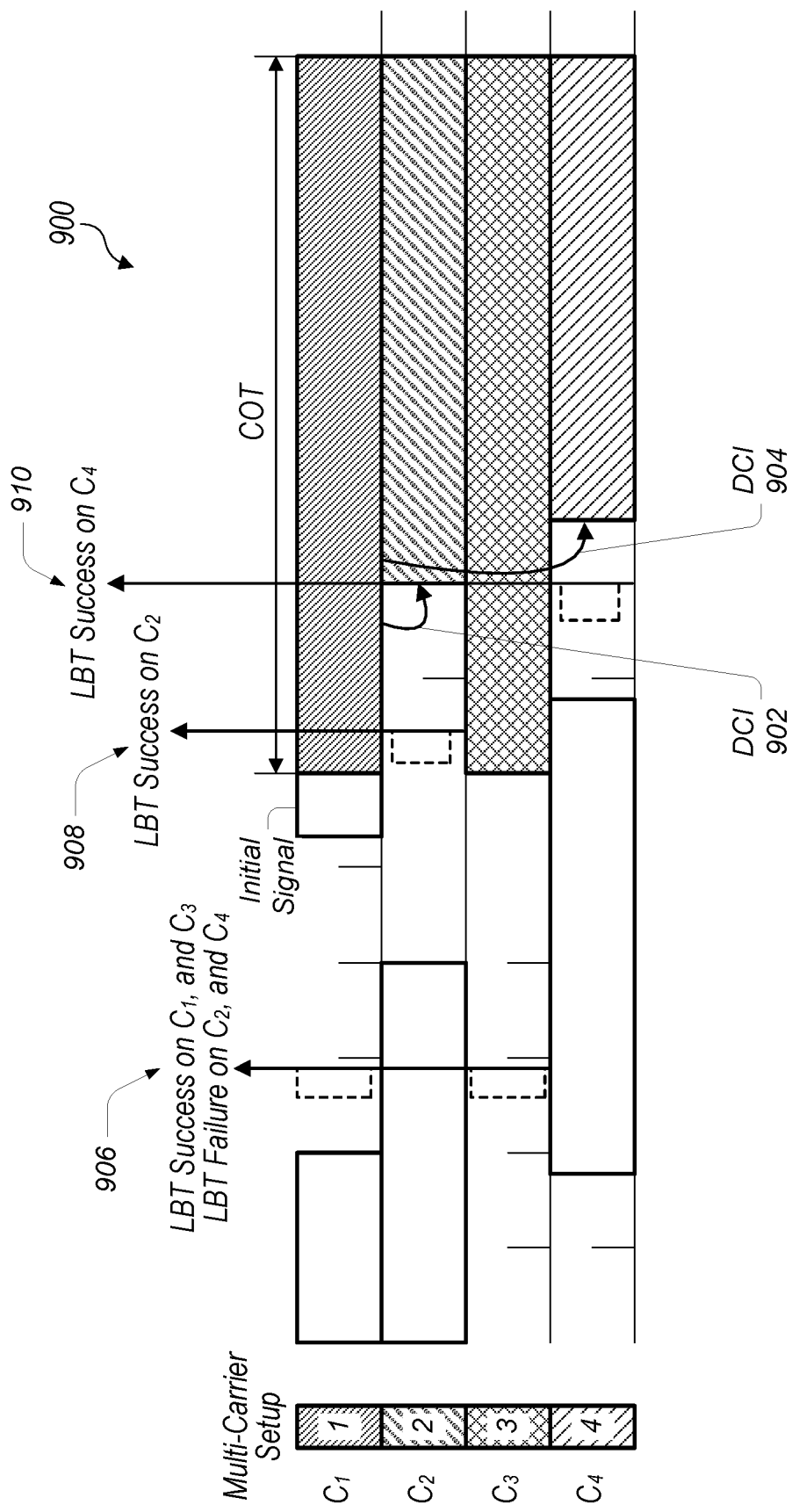
FIG. 9 shows an exemplary time diagram illustrating a multi-carrier based approach to implementing wideband transmission with narrowband monitoring, according to some embodiments.

This is illustrated in FIG. 9, in which four carriers, carrier 1 ($C_1$), carrier 2 ($C_2$), carrier 3 ($C_3$), and carrier 4 ($C_4$) are available for wireless communications. The default carrier in the example is $C_1$, and the IS for the UE is transmitted on $C_1$. As illustrated in FIG. 9, the UE has successfully completed LBT procedures on both $C_1$ and $C_3$, but not on $C_2$ and $C_4$ (see 906). Consequently, the UE may be operating using both $C_1$ and $C_3$. However, upon successful LBT on $C_2$ (see 908), which may be indicative of $C_2$ having become available for the UE to conduct wireless communications, $C_2$ may be activated for the UE, e.g. by the base station transmitting DCI 902 to the UE, cross-scheduling $C_2$, so the UE may now conduct wireless communications over $C_1$, $C_2$, and $C_3$. Upon successful LBT on $C_4$ (see 910), which may indicate that $C_4$ has also become available for the UE to conduct wireless communications, $C_4$ may be activated for the UE, e.g. by the base station transmitting DCI 904 to the UE, cross-scheduling $C_4$, so the UE may now conduct wireless communications over carriers $C_1$, $C_2$, $C_3$, and $C_4$.

Combined Approach

The multi-carrier based approach above provides a solution suitable for a non-contiguous spectrum but may require more network and/or UE resources to support that the BWP based approach, also described above, which requires fewer network and/or UE resources that the multicarrier approach but provides a solution suitable for a contiguous spectrum. Therefore, in some embodiments, the two approaches may be combined for further improvements. Depending on the interference location and type, it may be beneficial to combine contiguous spectra (spectrums) experiencing less interference into one carrier, leaving the heavily polluted spectrum as secondary carriers. For carriers that are partially affected by overlapping interference, the BWP-based approach may be used. For example, referring back to FIG. 9, assuming that $C_1$ and $C_2$ are experiencing less interference, they may be combined by scheduling communications of the UE over $C_1$ and $C_2$. However, if $C_1$ and $C_2$ are partially affected by overlapping interference, the BWP-based approach (as exemplified in FIG. 6, for example) may be used by involving in the combined spectrum the BWPs that are not affected by the overlapping interference.

For a spectrum polluted with relative narrowband signals, the BWP-based approach may be used with PDSCH (Physical Downlink Shared Channel) load wrapped around the interference using virtual physical resource block (vPRB) mapping. The setup may be semi-statistically changed or updated at the network side, e.g. based on UE feedback reports indicative of the traffic/interference measured by the UE.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to cause a device to:
perform first wireless communications according to a first radio access technology (RAT) within a first bandwidth part (BWP) of a first frequency band, wherein wireless communications according to one or more other RATs also take place in the first frequency band;
receive, as part of the first wireless communications, control information subsequent to a successfully completed listen-before-talk (LBT) procedure by the device within a specified portion of a second BWP of the first frequency band, wherein the control information instructs the device to communicate within the second BWP, wherein the second BWP contains the first BWP and the first BWP does not contain the specified portion of the second BWP;
begin communicating within the second BWP in response to receiving the control information; and
switch back from communicating within the second BWP to communicating within the first BWP at least in response to a channel occupancy time for present wireless communications of the device ending.

2. The apparatus of claim 1, wherein the control information is comprised in downlink control information.

3. The apparatus of claim 1, wherein the processor is configured to cause the device to receive the control information from a base station.

4. The apparatus of claim 1, wherein the first frequency band is in an unlicensed frequency spectrum.

5. The apparatus of claim 1, wherein the processor is configured to cause the device to monitor the first BWP for an initial signal that carries control information, subsequent to a successfully completed LBT procedure within the first BWP.

6. The apparatus of claim 1, wherein the processor is configured to cause the device to switch back from communicating within the second BWP to communicating within the first BWP in response expiration of a BWP-inactivity timer.

7. The apparatus of claim 1, wherein the first BWP is a narrowband BWP.

8. The apparatus of claim 1, wherein the device is one of a group of devices, wherein each respective device in the group of devices operates in a different respective default BWP assigned to the respective device in the first frequency band.

9. The apparatus of claim 8, wherein the different respective default BWPs assigned to the group of devices are non-overlapping.

10. The apparatus of claim 9, wherein remaining BWPs not assigned in the first frequency band as the different respective default BWPs overlap to ensure better spectrum efficiency.

11. The apparatus of claim 1, wherein a size of the specified portion of the second BWP is defined according to a type of expected interference from communications performed according to the one or more other RATs in the first frequency band.

12. A device comprising:
radio circuitry configured to facilitate wireless communications of the device; and
a processor communicatively coupled to the radio circuitry and configured to interoperate with the radio circuitry to:
perform first wireless communications according to a first radio access technology (RAT) over a first carrier corresponding to a first frequency band, wherein wireless communications according to one or more other RATs also take place in the first frequency band;
receive, as part of the first wireless communications, control information subsequent to a successfully completed listen-before-talk (LBT) procedure within a second frequency band, wherein the control information instructs the device to communicate over a second carrier corresponding to the second frequency band, wherein wireless communications according to one or more other RATs also take place in the second frequency band, wherein the second frequency band is not contiguous with the first frequency band;
communicate over the second carrier while also communicating over the first carrier in response to receiving the control information; and
cease communicating over the second carrier at least in response to a channel occupancy time for present wireless communications of the device ending.

13. The device of claim 12, wherein the processor is configured to further interoperate with the radio circuitry to monitor the first frequency band for an initial signal that carries control information, subsequent to a successfully completed LBT procedure within the first frequency band.

14. The device of claim 12, wherein the control information is included in downlink control information.

15. The device of claim 12, wherein the processor is configured to further interoperate with the radio circuitry to:
receive second control information instructing the device to no longer communicate over the second carrier; and
cease communicating over the second carrier while still communicating over the first carrier in response to receiving the second information.

16. A non-transitory memory element storing instructions executable by a processor to cause a device to:
perform first wireless communications according to a first radio access technology (RAT) within a first bandwidth part (BWP) of a first frequency band, wherein wireless communications according to one or more other RATs also take place in the first frequency band;
receive, as part of the first wireless communications, control information subsequent to a successfully completed listen-before-talk (LBT) procedure within a specified portion of a second BWP of the first frequency band, wherein the second BWP contains the first BWP and the first BWP does not contain the specified portion of the second BWP;
begin communicating within the second BWP in response to receiving the control information; and
switch back from communicating within the second BWP to communicating within the first BWP at least in response to a channel occupancy time for present wireless communications of the device ending.

17. The non-transitory memory element of claim 16, wherein the control information is comprised in downlink control information, and the first frequency band is in an unlicensed frequency spectrum.

18. The non-transitory memory element of claim 16, wherein the instructions are executable by the processor to cause the device to monitor the first BWP for an initial signal that carries control information, subsequent to a successfully completed LBT procedure within the first BWP.

19. The non-transitory memory element of claim 16, wherein the instructions are executable by the processor to cause the device to switch back from communicating within the second BWP to communicating within the first BWP in response to expiration of a BWP-inactivity timer.

20. The non-transitory memory element of claim 16, wherein the device is one of a group of devices, wherein each respective device in the group of devices operates in a different respective default BWP assigned to the respective device in the first frequency band;
   wherein the different respective default BWPs assigned to the group of devices are non overlapping; and
   wherein remaining BWPs not assigned in the first frequency band as the different respective default BWPs overlap to ensure better spectrum efficiency.

* * * * *